CATHODE RAY RECORDING OSCILLOGRAPH

Filed Sept. 22, 1951

Inventors:
Claude M. Hathaway
Warren D. Tilton, Jr.
By: Alois W. Graf
Attorney.

United States Patent Office 2,726,918
Patented Dec. 13, 1955

2,726,918

CATHODE RAY RECORDING OSCILLOGRAPH

Claude M. Hathaway and Warren D. Tilton, Jr., Denver, Colo., assignors to Hathaway Instrument Company, Denver, Colo., a corporation of Colorado Application September 22, 1951, Serial No. 247,806
5 Claims. (Cl. 346—33)

The present invention relates to a cathode ray oscillograph and more particularly to a control circuit therefor, whereby the intensity of the electron beam of the cathode ray tube is controlled or predetermined.

Heretofore, oscillographs generally have employed galvanometers which serve for recording phenomena up to frequencies up to 5,000 cycles per second. The frequency limitations of the galvanometer oscillograph do not permit recording frequencies higher than this. Accordingly, it has been proposed to employ cathode ray tube oscillographs. Generally, such oscillographs have been for a single channel and, hence, there has been a demand for a multi-channel cathode ray oscillograph.

In the use of multi-channel galvanometer oscillographs it also has been found convenient to have an arrangement for viewing the phenomena as well as for recording them. In the case of cathode ray oscillographs the intensity of the electron beam for viewing purposes generally is appreciably less than that needed for recording purposes. It therefore, would be desirable to provide some control arrangement whereby the proper intensity of the electron beam of the cathode ray tube would be assured whenever it is desired to make a record of a phenomenon to be observed. In accordance with the present invention, a control system is provided for a versatile and flexible multichannel cathode ray oscillograph.

It, therefore, is an object of the present invention to provide in a cathode ray oscillograph a control system for controlling the intensity of the electron beam of the cathode ray tube.

A further object of the invention is to provide in a cathode ray oscillograph, a system for controlling the intensity of the electron beam whenever a recording is to be made.

Figure 1:
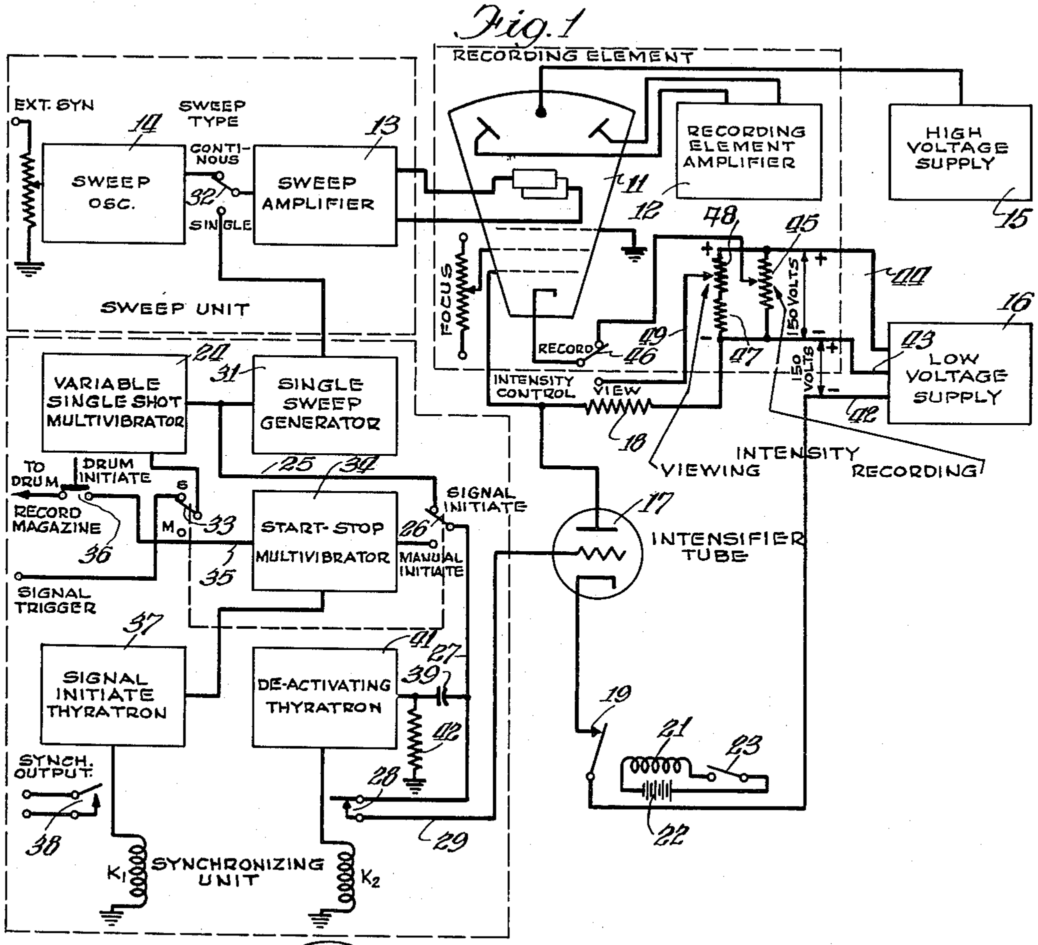
Figure 2:
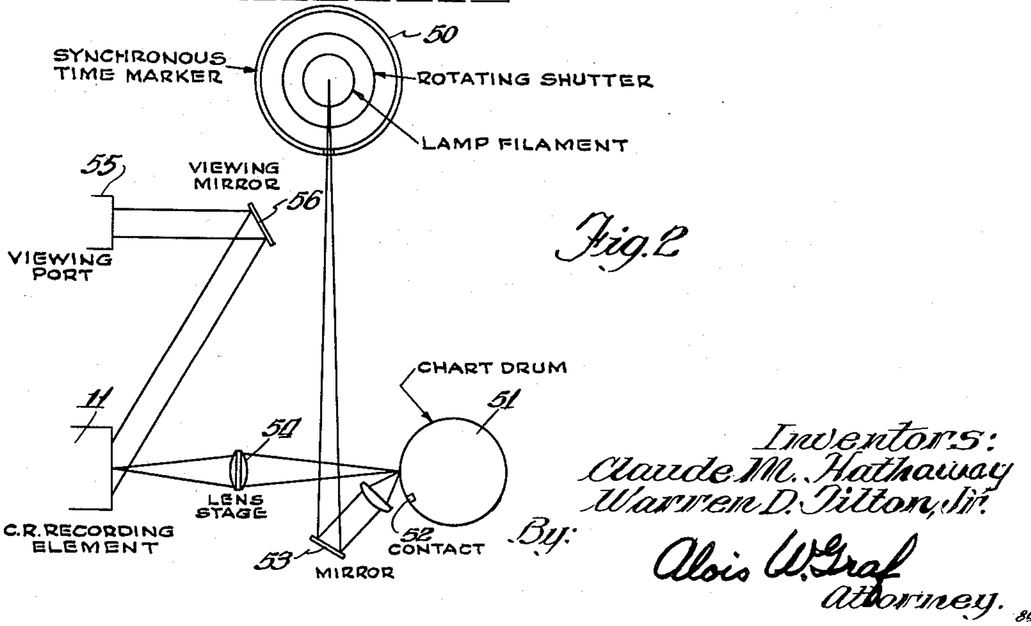

Further and other objects of the present invention subsequently will become apparent by reference to the following description taken in conjunction with the accompanying drawing wherein:

Figure 1 is a block and circuit diagram of a cathode ray oscillograph embodying the present invention; and Figure 2 is a schematic diagram of the optical system of the oscillograph.

Referring to Figure 1 there is shown a single cathode ray tube or recording element 11 of the electrostatic deflection type. In one embodiment of the present invention six such recording elements are employed. Each cathode ray tube was controlled by a recording element amplifier 12. All of the cathode ray tubes 11 were also controlled by a sweep amplifier 13. The sweep amplifier 13 is a portion of a sweep unit which includes a sweep oscillator 14. Suitable high voltage and low voltage supply sources 15 and 16 were common to all of the cathode ray tubes 11. All of the cathode ray tubes are likewise at other intensities controlled by a single intensity control circuit which includes a vacuum tube 17 and a series resistor 18. The intensifier tube 17 was controlled by two circuits, one of which included the switch 19 in the cathode anode circuit of the tube actuated by a relay 21. The relay 21 is connected in a circuit having a suitable source of potential 22 and an electric switch 23. The intensifier tube 17 is also controlled by the application of a cut-off voltage obtained from a synchronizing unit. This synchronizing unit consisted of a plurality of electron devices such as the variable single-shot multivibrator 24 connected to a conductor 25 terminating at one contact of a double-throw switch 26. The switch arm of switch 26 is connected to a conductor 27 which is connected to the normally close contacts 28 of a relay $K_2$. A conductor 29 extends from the contacts 28 to the grid of the intensifier tube 17. For certain types of operation the cut-off voltage supplied to the intensifier tube 17 is obtained from a single sweep generator 31 which is connected to one contact of a switch 32 arranged between the sweep oscillator 14 and the sweep amplifier 13. The switch 26 is arranged for simultaneous actuation with another switch 33 interposed between the variable single-shot multi-vibrator 24 and a terminal designated as "signal trigger." When the switches 33 and 26 are moved to their other position the conductor 27 is connected to the output of a start-stop multivibrator 34 having its input connected to a conductor 35 leading to a drum initiate switch 36 which, in turn, is connected to the drum record magazine. The start-stop multivibrator controls a signal initiate thyratron circuit 37 which actuates a relay $K_1$ having normally open contacts 38 which are connected to terminals labeled "synch. output." The conductor 27 is connected through a coupling capacitor 39 to a de-activating thyratron 41 which controls the energization of the relay $K_2$. The input circuit of the activating thyratron includes a grounded resistor 42.

The low voltage supply 16 has three conductors 42, 43 and 44. A voltage of 150 volts appears between the conductors 42 and 43 and a similar voltage appears between the conductors 43 and 44. The conductor 42 is connected through the switch 19 to the cathode of the intensifier tube 17. The series resistor 18 of the intensifier tube 17 is connected to the conductor 43. An adjustable resistor 45 is connected between the conductors 43 and 44 and has its movable contact connected to one terminal of a double-throw switch 46. The switch blade of the switch 46 is connected to the cathode of the cathode ray tube 11. Another resistor circuit also extends between the conductors 43 and 44 and includes a fixed resistor 47 and a voltage dividing resistor 48. The adjustable contact of the resistor 48 is connected to a conductor 49 which extends to the other contact of the double-throw switch 46. Normally the intensifier tube 17 is conductive so that a voltage drop occurs across the resistor 18 thereby to modify the potential applied to the grid of the cathode ray tube 11. When the intensifier tube is rendered non-conductive by the application of a cut-off voltage to its grid or by the interruption of its cathode circuit through the opening of the switch 19, no voltage appears across the resistor 18 so that the voltage supplied from the low voltage supply is the voltage which appears between the cathode and the grid of the cathode ray tube 11. It will be noted that the switch 46 has two positions labeled "record" and "view." When the switch 46 is moved toward view, the potential applied to the grid is that derived from a portion of the resistor circuit including the resistor 48. The movement of the switch 46 to the record position prepares the cathode ray tube 11 for intensification of its electron beam as soon as recording is to begin. The intensification of the electron beam occurs upon the rendering of the intensifier tube non-conductive.

Before explaining the operation of the block diagram of Figure 1 reference should be made to Figure 2 which shows the optical system of the oscillograph. The oscillograph is provided with a chart which in one instance is mounted on a chart drum 51. The chart drum is provided with an electrical contact 52 which cooperates with certain portions of the circuit indicated in Figure 1. In order to provide an indication of the time element, a synchronous time marker projects light upon a mirror 53 which strikes the chart on the drum 51. The image from the cathode ray recording element 11 passes through a lens 54 and also strikes the chart on the drum 51. The cathode ray recording element may be viewed from a viewing port 55 by means of a viewing mirror 56. While Figure 2 shows a chart drum 51 of the type which makes a single revolution for each loading of chart material, it is also possible to employ the more conventional continuous chart material which mechanism has two reels so that the chart material passes over a chart roller. The arrangement contemplated also is capable of use with stationary chart material in certain cases. The chart drum illustrated in Figure 2, however, is related to certain operation of the synchronizing unit of Figure 1 which subsequently will be described.

Although only one recording element is shown in the block diagram of Figure 1, a plurality of cathode ray tubes are similarly connected. The simplest type of operation is when the oscillograph is used for viewing only. The sweep oscillator and amplifier are required in order to provide the time axis. When the oscillograph is used for viewing, the sweep type switch is placed in the continuous position shown in solid lines in Figure 1. This applies sweep voltage to one pair of deflection plates of the cathode ray tube 11. The signal is observed at right angles to the ordinary oscilloscope presentation since the time axis for recording is provided by the movement of the chart. Whenever the switch 46 is moved to the viewing position the switch 23 is closed to energize the relay 21 thereby to open the contacts 19. The intensity of the electron beam may be controlled by adjusting the movable arm on the voltage divider resistor 48.

The switch unit circuits are not used when the oscillograph is to make a record on a moving chart since the motion of the chart provides the time axis. Initially, the cathode ray tubes are first focused with the intensity control switch in the record position. Another switch, not shown in the block diagram is associated with the motor switch for driving the recording chart. This switch corresponds to the switch 23 and is in parallel therewith to bring about energization of the relay 21. During the recording operation no voltages develop across the resistor 18 and the resistor 45 has a lower resistance value than the series resistor 47 normally connected in series with the resistor 48 for viewing purposes.

Where the drum type record magazine of the type shown in Figure 2 is employed, two different modes of operation are possible. The one is manual initiation of the record and of the transient to be recorded and the other is initiation of the record by the transient.

For manual initiation of the record and the transient cathode ray tubes 11 are automatically intensified by the contact 52 on the drum 51 after a suitable circuit, not shown, has been prepared. The tubes are de-intensified one revolution later when the same contact is closed again. In addition to intensifying the tubes, the drum contact 52 is arranged to operate a time speed relay circuit to close a pair of contacts which are connected to initiate the transient that is to be recorded.

For initiation of the record by the transient, the tubes 11 are automatically intensified by the application of a portion of the transient voltage at the terminal signal trigger of the synchronizing unit. In both types of operation the synchronizing unit controls the intensifier unit to bring the recording element beam of the cathode ray tube to recording intensity for the duration of the record.

In the manual initiate mode of operation the drum initiate switch 36 is closed so that when the contact 52 of the drum 51 completes a circuit with an associated contact, a voltage pulse is supplied to the start-stop multi-vibrator 34 which produces a negative gate voltage. This negative gate voltage is applied through the conductor 37 and the contacts 28 of the relay $K_2$ to the intensifier tube grid. A portion of this gate voltage is also supplied to the signal initiate thyratron 37 which energizes relay $K_1$ to close the contacts 38. These contacts may control the initiation of the transient to be recorded. When the contact 52 of the drum 51 again makes the contacts with its cooperating contact a voltage pulse is again supplied to the start-stop multi-vibrator 34, causing it to return to its initial condition. The trailing edge of the gate voltages generated by the start-stop multivibrator operates the de-activating thyratron 41 to energize the relay $K_2$ and open the contacts 28 so that the grid of the intensifier tube 17 no longer is biased to cut-off. The current, therefore, flows through the resistor 18 to reduce the intensity of the electron beam of the cathode ray tube 11. If the drum 51 should continue to rotate, successive voltage impulses therefrom will operate the start-stop multi-vibrator, but the thyratrons 37 and 41 will not be affected since they remain in a conductive condition. A suitable circuit including a reset button is provided for removing the plate voltage from the thyratron when it is desired to restore the synchronizing unit to its initial condition.

In the signal initiate mode of operation the leading edge of the transient which is to be recorded is applied to the signal trigger terminal which controls the variable single-shot multi-vibrator 24. This multi-vibrator also produces a negative gate voltage which is applied to the grid of the intensifier tube 17. The multi-vibrator 24 is provided with suitable controls so that the negative gate voltage generated has a time duration at least as long or longer than the time duration of the transient to be recorded. The trailing edge of the gate voltage supplied by the multivibrator 23 also operates the de-activating thyratron 41 in the same way as was done in the manual initiate mode of operation.

When a stationary recording chart is to be used the single sweep generator 31 is connected by the switch 34 to the sweep amplifier to provide the necessary time axis. The single sweep generator voltage is amplified by the sweep amplifier 13.

In one embodiment of the invention six recording elements corresponding to the cathode ray tube 11 were employed. Provision was made for recording on a stationary chart, recording on a magazine chart and recording on two different drums of the type indicated in Figure 2. One drum was 15″ in diameter providing speeds from 4.5″ to 600″ per second and the other drum provided speeds from 600″ per second to 6,000″ per second. Speeds from 1.5″ to 200″ per second were obtained from the continuously driven magazine chart.

While for the purpose of illustrating and describing the present invention a particular embodiment has been indicated by the drawing and described in the foregoing specification, it is to be understood that the invention is not to be limited thereby, since such other embodiments are contemplated as may be commensurate with the spirit and scope of the invention set forth in the accompanying claims.

We claim:

1. In a cathode ray oscillograph the combination comprising a cathode ray tube, a source of potential for controlling the beam intensity of said cathode ray tube, means including a vacuum tube and a resistor for modifying the effective electron beam potential supplied thereto, a recording drum mechanism provided with means for producing an electrical impulse in accordance with the revolution of said drum mechanism, electron means responsive to said impulse to apply for a predetermined time interval, a cut-off voltage to said vacuum tube thereto to intensify the electron beam of said cathode ray tube, and a thyratron circuit responsive to the end of said time interval to interrupt the circuit between said electron means and said vacuum tube.

2. In a cathode ray oscillograph, the combination of a cathode ray tube having a control grid for controlling the electron beam intensity thereof, a source of potential, a resistor connected to said grid, a vacuum tube interposed between one terminal of said resistor and said potential source, means connecting another terminal of said resistor to said source, a recording drum mechanism provided with means for producing an electrical impulse during each revolution, a multivibrator arranged responsive to said electrical impulses, and means controlled by said multivibrator for rendering said vacuum tube non-conductive.

3. The combination comprising a cathode ray tube having a cathode and a control grid, a source of potential, a resistor connected between said cathode and said grid, a vacuum tube interposed between one terminal of said resistor and said source, means connecting another terminal of said resistor to said source, a recording drum mechanism provided with means for producing an electrical impulse during each revolution, a multivibrator arranged responsive to said electrical impulses, means responsive to the leading edge of the multivibrator pulse to render said vacuum tube non-conductive, and means responsive to the trailing edge of the multivibrator pulse to restore said previous means responsive to the leading edge of the multivibrator pulse to original condition.

4. The combination comprising a cathode ray tube having a cathode and a control grid, a source of potential, a resistor connected between said cathode and said grid, a vacuum tube interposed between one terminal of said resistor and said source, means connecting another terminal of said resistor to said source, a recording drum mechanism provided with means for producing an electrical impulse during each revolution, a multivibrator arranged responsive to said electrical impulses, thyratron means responsive to the leading edge of the multivibrator pulse to render said vacuum tube non-conductive, and thyratron means responsive to the trailing edge of the multivibrator pulse to render said vacuum tube conductive.

5. In a cathode ray oscillograph, the combination of a cathode ray tube having a cathode and a control grid for controlling the electron beam intensity, a source of potential, a plurality of voltage dividers connected across said source of potential, one divider normally being connected between said cathode and said grid, manual switching means for changing said cathode from said first divider to said other divider to provide a different bias potential, a vacuum tube interposed between one terminal of said voltage dividers and said potential source, manually operable means for rendering said vacuum tube non-conductive thereby to interrupt the flow of current from said source of potential through said resistor, a recording drum mechanism provided with means for producing an electrical impulse during each revolution, and electron means responsive to said impulse for automatically rendering said vacuum tube non-conductive.

References Cited in the file of this patent

UNITED STATES PATENTS

| | | |
|---|---|---|
| 2,343,988 | Mahoney | Mar. 14, 1944 |
| 2,501,352 | Opsahl | Mar. 21, 1950 |
| 2,584,175 | Williams | Feb. 5, 1952 |